UNITED STATES PATENT OFFICE.

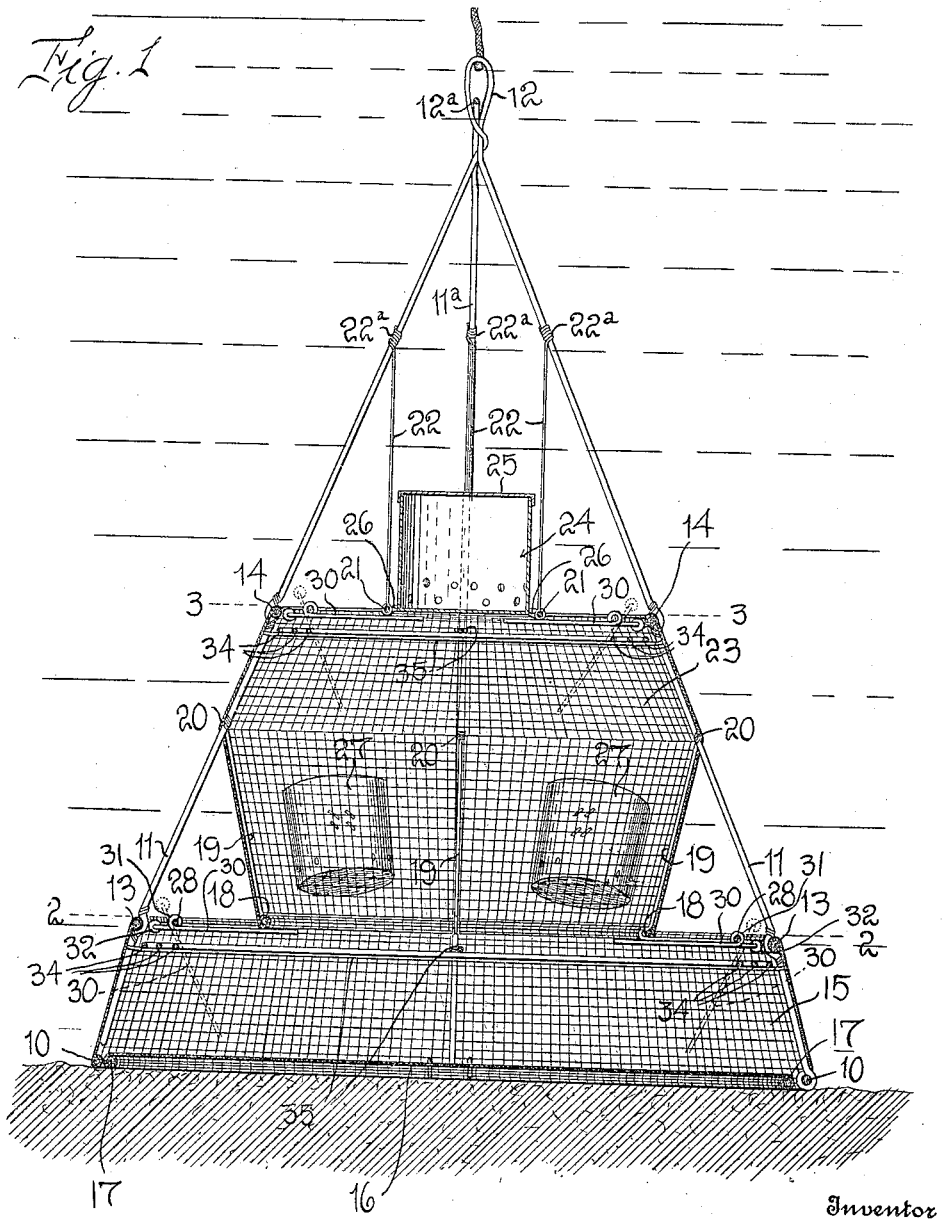

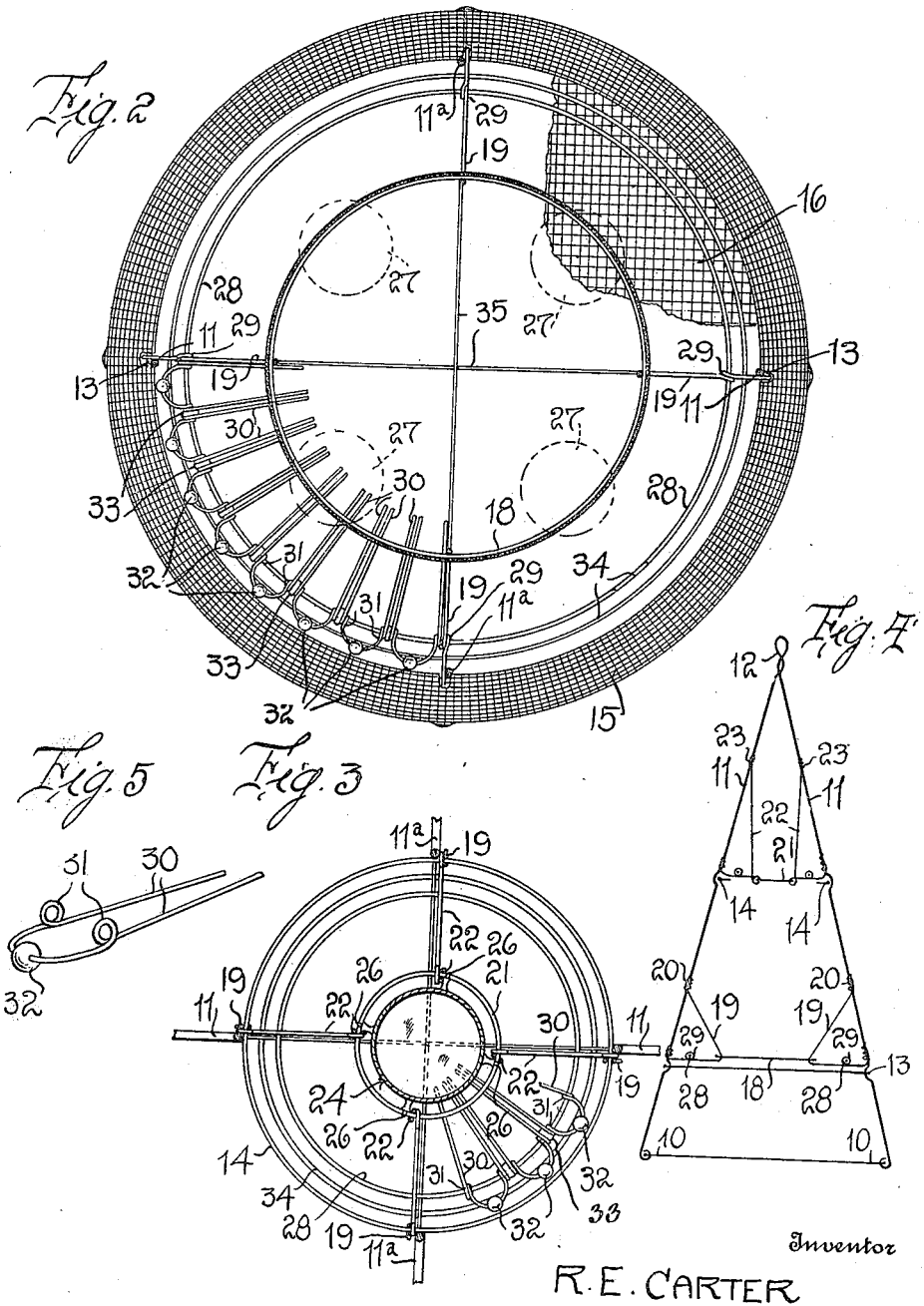

ROBERT E. CARTER, OF MIDDLETOWN, NORTH CAROLINA.

CRAB AND TERRAPIN TRAP.

1,223,851.　　　　　Specification of Letters Patent.　　Patented Apr. 24, 1917.

Application filed December 20, 1916. Serial No. 138,061.

*To all whom it may concern:*

Be it known that I, ROBERT E. CARTER, a citizen of the United States, residing at Middletown, in the county of Hyde and State of North Carolina, have invented certain new and useful Improvements in Crab and Terrapin Traps, of which the following is a specification, reference being had to the accompanying drawings.

This invention relates to traps and more particularly to traps for catching crabs, terrapin, turtles and such like animals.

The general object of my invention is to provide a very simply constructed trap in which the trap proper is easily operated by the animal and in which the entrance opening or openings of the trap extend entirely around the body of the trap so that the animals can gain access to the trap from all sides.

A further object of the invention is to provide a trap body having a plurality of entrance openings annular in form and disposed at various levels.

A further object is to provide a trap so constructed that while entrance may be readily effected by an animal, yet the exit of the animal from the trap is prevented and in this connection to provide means for absolutely preventing the operation of the trap doors, as they may be called, from the inside of the trap body.

Other objects will appear in the course of the following description.

My invention is illustrated in the accompanying drawings, wherein,

Figure 1 is a vertical longitudinal sectional view of a trap constructed in accordance with my invention;

Fig. 2 is a section on the line 2—2 of Fig. 1;

Fig. 3 is a section on the line 3—3 of Fig. 1;

Fig. 4 is a diagrammatic view illustrating the manner in which the wire frame of the trap is formed; and Fig. 5 is a perspective detail view of a pair of connected fingers.

Referring to these drawings and particularly to Fig. 1, it will be seen that the frame of the trap consists of a base ring 10 which may be of any suitable diameter but which in actual practice I have found best to make about two feet in diameter. Extending upward convergently from this base ring are four or more rods 11 and 11ª. I have shown four of these rods. These rods or braces may be conveniently formed by bending a piece of wire in the middle to form a loop 12 and then extending the legs downwardly and outwardly to the base ring 10 and engaging the lower ends of the legs with the base ring. The braces 11ª are formed in the same manner as the braces 11 but the loop 12 is disposed to extend through the base ring in the manner best shown in Fig. 1.

Above the base ring 10 there is provided a supporting ring 13 of relatively heavy wire, the braces 11 being inwardly bent to accommodate the ring 13 and the ring being connected to these braces in any suitable manner as by tying the parts together with wire or soldering the ring 13 to the braces. Midway of the length of the braces there is provided a third supporting ring 14, smaller of course in diameter than the ring 13 and the braces are in this case bent outward or curved around the ring 14 and the ring is connected to the braces in any suitable manner as by lashing the ring with wire or soldering it to the braces.

The space between the ring 10 and 13 is covered by a wall 15 of wire gauze which is attached to the rings 10 and 13 in any suitable manner. The trap has a bottom 16 which may be conveniently formed of wire gauze, this wire gauze being supported upon a ring 17 to which it is attached and the bottom may be hingedly connected to the ring 10 so as to open or may be detachably connected to this ring at a plurality of points as desired.

Disposed above the bottom 16 and on a level with the ring 13 is a ring 18 having a diameter ordinarily about four inches smaller than the diameter of the ring 13. This ring 18 is supported by a plurality of supporting wires 19, these wires as illustrated in Fig. 4, each being connected at its upper end as at 20 to the corresponding brace 11 extending downward and inward, being bent to partially embrace the ring 18, then extended laterally outward and being engaged with the wire 13. On a level with the ring 14 there is disposed an inner ring 21 and this ring in turn is supported by wires 22 each one of which is attached at its upper end to one of the braces 11 as at 22ª, then extends straight downward, is engaged with the ring 21, then extended laterally and is engaged with the ring 14 and with the corresponding brace.

The rings 18 and 21 are for the purpose of supporting a trap body or receptacle 23 of wire gauze. This wire gauze is attached at its upper edge to the ring 14, then extends downward and outward exteriorly of the braces 11 to a predetermined distance and then extends downward and slightly inward and is attached at its lower edge to the ring 18 as best shown in Fig. 1. Supported by the ring 21 is a bait box 24 having a removable top 25 and perforated side walls. This bait box is attached to the ring 21 in any suitable manner as by wire loops 26. Within the body 23 there is also provided preferably a plurality of bait boxes designated 27, each of which has a removable closure and each of which is perforated, these bait boxes being attached to the wire gauze forming the body by any suitable means. Preferably there are four of these bait boxes disposed in spaced relation against the side walls of the body 23.

It will be seen that I have provided two places for entering the trap, one of these places being the annular space between the rings 13 and 18 and the other the annular space between the rings 14 and 26. It is necessary of course to provide means whereby animals may enter the trap through these spaces but prevent exit from the trap. To this end I support upon the wires 19 where they extend between the rings 18 and 13 the ring 28. I have illustrated this ring as being supported by means of loops 29 formed upon the wire 19 between the rings 18 and 13. Pivotally mounted upon this ring 28 are a plurality of pairs of fingers 30. Each pair of fingers, as illustrated in Fig. 5, is formed of a piece of wire bent at its middle to form two converging legs, these legs being bent at 31 to form loops or eyes embracing the ring 28 and rotatable thereon. The outer end of each pair of connected fingers is weighted by a weight 32 and these weights more than counterbalance the long ends of the fingers. These fingers extend inward beyond the ring 18 and, therefore, the weights normally support these fingers in a horizontal position with their free ends abutting against the ring 18. These several pairs of pivoted fingers are disposed very closely adjacent to each other and are separated from each other by the washers 33 which prevent the fingers from binding upon each other and permit the fingers to have free pivotal movement upon the ring 28. It will be obvious now that when the weight of an animal comes upon one or more pairs of these fingers, the fingers will yield and the animal will be precipitated into the interior of the trap. In order to prevent too great a movement of the fingers which would carry the weights inward beyond the ring 28 and thus cause the fingers to remain open, I preferably provide a series of guard wires designated 34, these guard wires being disposed at spaced intervals beneath the outer ends of the pivoted fingers and being supported upon cross wires 35 attached to the braces 11 as most clearly illustrated in Fig. 1. It will be obvious that these guard wires form a screen preventing an animal from accidentally forcing up upon the outer ends of the fingers, thus depressing the free ends and permitting the escape of animals from the trap.

The same construction is used for the purpose of permitting access to the upper entrance opening but preventing the exit of animals therefrom. Pairs of radial fingers are used, constructed in exactly the same manner as heretofore described, therefore, the same reference numerals are used for these fingers. Guard wires 34 are also used beneath the outer ends of these upper fingers. The practical use of this invention will be obvious. The trap may either be sunk so as to rest upon the bottom of the river or other piece of water, or the trap may be raised by a float to any desired height above the bottom. Animals will be attracted by the smell of the bait within the bait cans and in endeavoring to get at the bait will depress the inner ends of the several fingers and fall into the trap. Exit from the trap is of course prevented by these fingers and by the guard members 34, as previously described. A suitable interval after the setting of the trap, the trap is removed and the bottom released and the trap cleaned and baited ready for resetting. It will be seen that my trap is very simple in construction, that the wire netting is thoroughly braced by the rods 11 and the wires 22 and 19 and that there is nothing to get out of order and that even if some of the fingers become foul or blocked, other fingers will operate so that the trap is still capable of its purpose.

Having described my invention, what I claim is:

1. In a trap, an annular body formed of a lower portion and an upper portion less in diameter than the lower portion whereby to provide an annular entrance opening disposed in a horizontal plane and extending entirely around the upper portion of the body, a ring supported in said entrance opening in concentric relation to the annular body, and a plurality of fingers pivotally mounted upon the ring, having their outer ends counterweighted and their inner ends normally engaging beneath the lower end of the upper portion of the body.

2. In a trap, an annular body formed of a lower portion and an upper portion less in diameter than the lower portion whereby to provide an annular entrance opening disposed in a horizontal plane and extending entirely around the upper portion of the body, a ring supported in said entrance opening in concentric relation to the annular body, and a plurality of pairs of fingers pivotally mounted upon the ring having their outer ends counterweighted and their inner ends normally engaging beneath the lower end of the upper portion of the body, said pairs of fingers being formed with eyes embracing the ring.

3. In a trap, an annular body formed of a lower portion and an upper portion less in diameter than the lower portion whereby to provide an annular entrance opening disposed in a horizontal plane and extending entirely around the upper portion of the body, a ring supported in said entrance opening in concentric relation to the annular body, a plurality of pairs of fingers pivotally mounted upon the ring having their outer ends counterweighted and their inner ends normally engaging beneath the lower end of the upper portion of the body, said pairs of fingers being formed with eyes embracing the ring, and an annular screen disposed below the outer ends of the fingers and preventing access thereto.

4. A trap comprising a plurality of upwardly converging braces arranged in spaced relation, a lower annular body formed of perforate material attached to said braces, an upper annular body supported by said braces and having its lower edge concentric to the upper edge of the first named portion of the body and spaced therefrom, a bait box supported at the upper end of the upper body portion and concentric thereto, there being an annular entrance opening between the bait box and the members and between the lower end of the edge of the second named body portion and the upper edge of the first named body portion, both of said annular openings being disposed in horizontal planes and a plurality of pivoted fingers operatively supported across said entrance openings and having counterweighted outer ends, the fingers being disposed side by side and being independently movable.

5. A trap of the character described comprising a base ring, upwardly and inwardly extending braces attached to the base ring, a second ring disposed above the base ring and attached to said brace, a third ring disposed above the second ring and attached to the bases, a wall of perforate material attached to the base and second rings and to said braces, a wall of perforate material attached at its upper edge to the third ring, extending downward along said braces and attached thereto, and then extending downward and inward, an operatively supported ring to which the lower edge of this last named wall is attached, a ring supported from the braces and disposed on a level with the upper edge of the second named wall, a ring operatively supported between the second named ring and the lower edge of the second named wall, a plurality of pairs of fingers independently pivoted upon said last named ring, the fingers being counterweighted at their outer ends whereby they are yieldingly held in a horizontal position, a ring disposed between the third named ring, a bait box concentric thereto and operatively supported upon the braces, a plurality of pairs of counterweighted fingers swingingly mounted upon the last named ring and normally supported in a horizontal position, and a bottom operatively engaged with the base ring.

In testimony whereof I hereunto affix my signature in the presence of two witnesses.

ROBERT E. CARTER.

Witnesses:
E. M. JENNETTE,
R. L. CARTER.